Nov. 6, 1951   B. M. HYMAN   2,573,909
CORN HUSKING ATTACHMENT FOR PORTABLE FARM ELEVATORS
Filed Dec. 6, 1949

INVENTOR
BENJAMIN M. HYMAN
Paul O. Pippel
ATTY

Patented Nov. 6, 1951

2,573,909

UNITED STATES PATENT OFFICE 2,573,909

CORNHUSKING ATTACHMENT FOR PORTABLE FARM ELEVATORS

Benjamin M. Hyman, Moline, Ill., assignor to International Harvester Company, a corporation of New Jersey Application December 6, 1949, Serial No. 131,405

2 Claims. (Cl. 130—5)

This invention relates to a crop processing attachment for portable farm elevators of the type used for elevating farm produce to a storage receptacle and more specifically to a corn husking attachment for farm elevators.

In recent years machines have been designed to do the complete corn processing operation in the field. That is, the machine gathers and husks the corn while being moved over the field. Inasmuch as it is sometimes desirable to leave the husks on the ears of the picked corn until the ears are ready to be stored, the present invention contemplates a compact attachment for a conventional farm elevator whereby the husking operation is efficiently and easily accomplished just prior to the elevation of the ears to the storage receptacle.

Another object is the provision of a corn husking attachment in which means are provided to expel husks from the receiving hopper.

Still another object is the provision of a conveyor which moves the husks to the outlet opening in the hopper and also delivers shelled corn to the conveyor trough of the portable elevator.

A further object is the provision of a drive shaft which receives power from the farm elevator for driving the ear conveyor, husk conveyor, husking rolls and the discharge fan and also provides the connecting means for pivotally attaching the receiving hopper to the portable farm elevator.

The foregoing and other important objects and desirable features inherent in and encompassed by the invention together with many of the purposes and uses thereof will become readily apparent from a reading of the ensuing description in conjunction with the annexed drawings in which.

Figure 1:
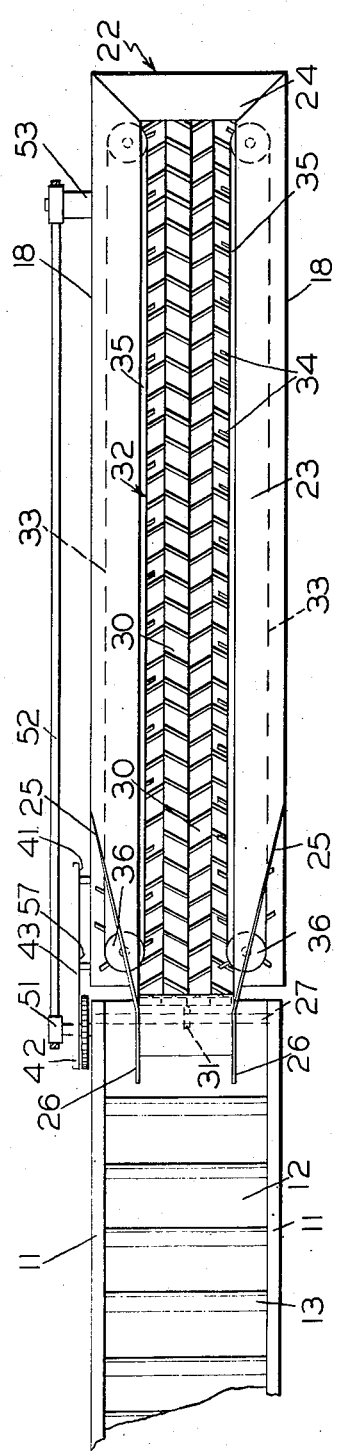
Fig. 1 is a plan view of the corn husking attachment and a portion of the portable farm elevator.

Referring to the drawings in which like reference characters designate like elements throughout the various views, there is shown a portion of a portable farm elevator 10. The portable farm elevator 10 has a conveyor trough 11 which extends angularly upwardly and is provided at its open end with a discharge section (not shown) to direct the material being elevated to a storage receptacle. The conveyor trough 11 has a bottom portion 12 over which a conventional type of endless conveyor track 13 moves. The endless conveyor 13 is driven by means of a shaft 14 which is capable of being rotated by the power take-off of a tractor (not shown). A suitable power transmission mechanism is connected to shaft 14 to rotate sprockets 15 and shaft 16 for moving the endless conveyor track 13 in a longitudinal direction.

Figure 2:
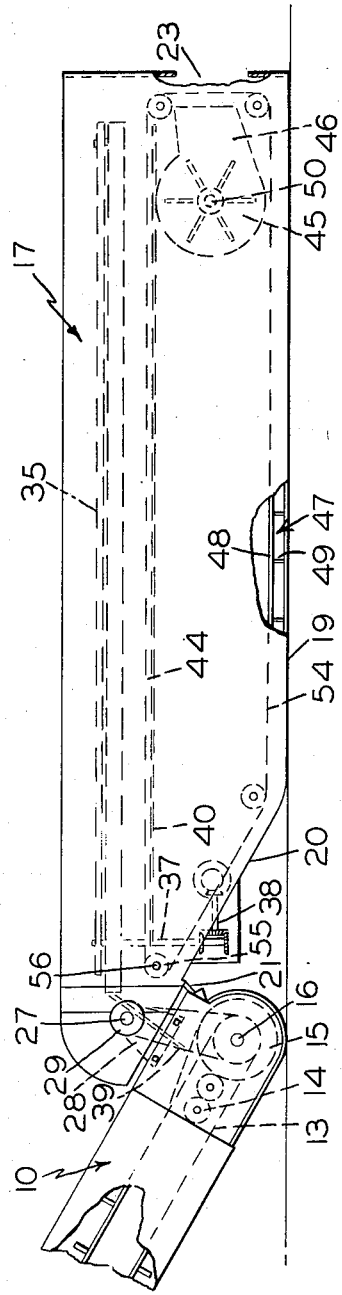
Fig. 2 is a side elevational view of the corn husking attachment.

Horizontally disposed and extending longitudinally to the rear of the elevator 10 is a receiving hopper 17. The receiving hopper 17 includes a pair of laterally spaced vertically extending side walls 18 connected along their lower edges to a bottom wall 19. The bottom wall 19 has a portion 20 sloping upwardly which in turn is provided with a downwardly projecting lip portion 21. The rearwardly facing end wall 22 has an outlet opening 23 formed therein for a purpose which will be explained hereinafter. Rigidly fastened along the top marginal edges of side walls 18 and end walls 22 are side boards 23—24 which extend inwardly and downwardly and serve as a guide means for directing material to the center of the hopper 17. It will be noted that the top edge portions 25 of the side boards 23 converge slightly at one end, as best shown in Fig. 1, to form a throat section. The side walls 23 extend inwardly and then longitudinally to form ear portions 26. A transversely extending shaft 27 is rotatably supported between the ear portions 26. Attached to each side wall of the conveyor trough 11 is a bracket 28 which supports a bearing member 29 adapted to rotatably receive one of the ends of the shaft 27 whereby the receiving hopper 17 is pivotally connected to the elevator and may be swung from a horizontal position as shown in Fig. 2 to a transport position wherein it is raised upwardly and lowered over the top of the conveyor trough 11 as amply described in patent application Serial No. 38,663 entitled "Spring Balanced Receiving Hopper for Portable Elevator" of the present inventor and assignee.

Rotatably supported within the upper portion of the hopper 17 are two sets of horizontally disposed husking rolls 30 which extend substantially the entire length of the hopper. The husking rolls 30 are driven by means of a gear 31 keyed to rotatable shaft 27 and suitable transmission gearing. Shaft 27 is drivingly connected to shaft 16 by endless chain 39.

In order to insure a steady feeding of ears to the elevator 10 an ear forwarding conveyor 32 is provided above the husking rolls 30 which includes a pair of transversely spaced endless chains 33 adapted to move in a horizontal plane slightly above the horizontal plane in which the husking rolls lie. The endless chains 33 are positioned along one side of each set of husking rolls 30 and have a plurality of spaced fingers 34 fastened thereto in a conventional manner. It will be apparent that the fingers 34 of one run 35 of each chain 33 overhang the husking rolls 30. The chains 33 are driven in a forward direction whereby runs 35 move toward the elevator 10 and thus continuously urge the ears to the left as viewed in Fig. 1. Power is received for rotating drive sprockets 36 which mesh with the chains 33 by means of vertical shafts 37 which in turn are rotated by horizontally disposed longitudinally extending shafts 38. The shafts 38 are drivingly connected to a transversely extending shaft 40 having one end protruding from a side wall 18 to rigidly support a sprocket 41. Shaft 27 has a sprocket 42 keyed thereon which drives a chain 43 meshable with sprocket 41. Hence it will be apparent that the ear forwarding conveyor 32 is driven from shaft 27.

Vertically spaced below the husking rolls 30 and extending substantially the entire length of the husking rolls is a horizontally disposed corn saving grid 44 rigidly supported within the hopper. The grid 44 is of conventional design and is of the type which allows kernels of corn which are broken off during the husking operation to drop to the bottom wall 19 of the hopper 17, but prevents the removed husks from doing likewise.

A rotary blower fan 45 is supported within the hopper 17 adjacent the end wall 22 and has a discharge section 46 extending rearwardly toward the outlet opening 23. It will be noted that the discharge section 46 terminates a short horizontal distance from the end wall 22. An endless conveyor 47 comprising a pair of transversely spaced endless chains 48, only one of which is shown, interconnected by a plurality of transversely extending slats 49 has one run adapted to move rearwardly over the corn saving grid 44 and thus moves husks toward the end wall 22. The conveyor 47 is trained vertically downwardly adjacent the end wall 22 and is caused to move between the discharge section 46 of the fan 45 and the end wall 22 whereby the air current set up by the fan passes through the conveyor 47 and removes the husks from the conveyor. Inasmuch as the outlet opening 23 is in the path of the air current the husks are expelled through the outlet opening to the exterior of the hopper. The rotor shaft 50 of the fan 45 is rotated by means of a belt pulley 51 keyed to the end of the shaft 27 which in turn drives a belt 52. The belt 52 engages a pulley 53 keyed to the rotor shaft 50.

The lower run 54 of the conveyor 47 is caused to move forwardly over the bottom wall 19 including portion 20 where it terminates near the lip portion 21. It will be appreciated that kernels of corn knocked off the ears during the husking operation and deposited on the bottom wall 19 will be moved along the bottom wall 19 to the lip portion 21 where they are directed to the conveyor trough 11. The conveyor 47 is drivingly connected to shaft 27 by means of a horizontally disposed shaft 55 having a pair of transversely disposed sprockets 56 meshable with the chains 48 and a sprocket 57 keyed to one end of the shaft 55 projecting from the hopper 17. Chain 43, driven by shaft 27, is trained beneath sprocket 57.

It will be obvious that a compact husking attachment has been devised which is particularly useful in combination with a portable farm elevator. The husk attachment is self-contained and does a complete and efficient job of processing picked corn just prior to storage. The embodiment of the invention chosen for the purposes of illustration and description herein is that preferred for achieving the objects of the invention and developing the utility thereof in the most desirable manner, due regard being had to existing factors of economy, simplicity of design and construction, and the improvements sought to be effected. It will be appreciated, therefore, that the particular structural and functional aspects emphasized herein are not intended to exclude but rather to suggest such other adaptations and modifications of the invention as fall within the spirit and scope of the invention as defined in the appended claims.

What is claimed is:

1. A husking attachment for a portable farm elevator having a conveyor trough comprising a horizontally disposed, longitudinally extending receiving hopper connected to said conveyor trough at one end and provided with an outlet opening in the other end; corn husking means extending substantially the entire length of said hopper, said corn husking means including two sets of horizontally disposed husking rolls rotatably journaled in said hopper; ear conveyor means positioned above and along one side of each set of husking rolls for moving the ears toward said conveyor trough, said ear conveyor means including a pair of transversely spaced, horizontally disposed endless chains having a plurality of spaced fingers secured thereto adapted to overhang the husking rolls; a husk-receiving chamber beneath said husking rolls; conveyor means adapted to operate within said husk-receiving chamber for moving husks away from said conveyor trough toward said outlet opening, said conveyor means including a pair of transversely spaced vertically disposed endless chains interconnected by a plurality of transversely extending slats; a corn saving grid supported within said hopper beneath said husking means adapted to form the bottom of the husk-receiving chamber; a shelled corn receiving compartment including the bottom wall of said hopper; means including said conveyor means movable over said bottom wall for delivering shelled corn to said conveyor trough; discharge means for expelling husks from the hopper including a fan positioned within the hopper adapted to exhaust through said outlet opening, said conveyor means being movable between said fan and said outlet opening whereby husks carried by said conveyor means are expelled from the hopper; and drive means for receiving power from said portable farm elevator for driving said corn husking, ear conveyor, conveyor, and discharge means including a transversely extending shaft rotatably mounted on said hopper, said shaft having portions cooperating with said conveyor trough to provide a pivotal connection whereby said hopper may be swung with respect to said farm elevator.

2. A husking attachment for a portable farm elevator having a conveyor trough comprising a longitudinally extending receiving hopper connected to said conveyor trough at one end and provided with an outlet opening in the other end; corn husking means extending substantially the entire length of said hopper; ear conveyor means positioned above and along the sides of the husking means for moving the ears toward said conveyor trough; a husk-receiving chamber beneath said husking rolls; conveyor means adapted to operate within said husk-receiving chamber for moving husks away from said conveyor trough toward said outlet opening; a corn saving grid supported within said hopper beneath said husking means adapted to form the bottom of the husk-receiving chamber; a shelled corn receiving compartment including the bottom wall of said hopper; means including said conveyor means movable over said bottom wall for delivering shelled corn to said conveyor trough; discharge means enclosed within said hopper for expelling husks from the hopper, said conveyor means being movable between said discharge means and said outlet opening; and drive means for receiving power from said portable farm elevator for driving said corn husking, ear conveyor, conveyor, and discharge means including a transversely extending shaft rotatably mounted on said hopper, said shaft having portions cooperative with said conveyor trough to provide a pivotal connection whereby said hopper may be swung with respect to said farm elevator.

BENJAMIN M. HYMAN.

REFERENCES CITED

The following references are of record in the file of this patent:

UNITED STATES PATENTS

| Number | Name | Date |
| --- | --- | --- |
| 879,405 | McInturf | Feb. 18, 1908 |
| 1,444,009 | Schroeder | Feb. 6, 1923 |
| 1,471,898 | Keeler | Oct. 23, 1923 |
| 1,695,324 | Duerr | Dec. 18, 1928 |
| 1,734,391 | Mitchell | Nov. 5, 1929 |
| 2,080,717 | Hitchcock | May 18, 1937 |
| 2,286,279 | Hyman et al. | June 16, 1942 |
| 2,298,198 | Coultas et al. | Oct. 6, 1942 |
| 2,467,535 | Rinehart | Apr. 19, 1949 |